May 5, 1959  L. L. KEPKAY  2,885,120
BAGGER ATTACHMENT FOR COMBINES
Filed June 4, 1956  5 Sheets-Sheet 1

*INVENTOR.*
LESLIE L. KEPKAY
BY
*James E. Nilles*
ATTORNEY.

May 5, 1959 — L. L. KEPKAY — 2,885,120
BAGGER ATTACHMENT FOR COMBINES
Filed June 4, 1956 — 5 Sheets-Sheet 3

INVENTOR.
LESLIE L. KEPKAY
BY James E. Nilles
ATTORNEY.

INVENTOR.
LESLIE L. KEPKAY
BY
James E. Nilles
ATTORNEY.

2,885,120

BAGGER ATTACHMENT FOR COMBINES

Leslie L. Kepkay, Toronto, Ontario, Canada, assignor to Massey-Ferguson Inc., a corporation of Maryland Application June 4, 1956, Serial No. 589,255

4 Claims. (Cl. 222—76)

This invention relates generally to harvesters and finds particular utility in self-propelled combines having a large crop storage tank located on the top side thereof. More specifically the invention relates to a bagger attachment for combines which permits the crop material to be bagged as the machine continues to move over the field and harvest the crop.

It is an object of this invention to provide a bagger attachment for a combine which receives the crop material from the power driven unloading auger in the grain tank and which has means for actuating this unloading auger only when the discharge door in the bagger spout is open.

It is another object of this invention to provide a novel bagger spout attachment for a combine grain tank.

It is a general object of this invention to provide an improved bagger attachment for combines which is readily adapted to machines of existing design, economical to manufacture and efficient in operation.

Other objects and advantages will become more apparent from the following detailed description, taken in conjunction with the attached sheets of drawings in which, by way of preferred example only, is illustrated the invention. Accordingly, the present invention may be considered as comprising the various constructions, combinations or subcombinations of parts as is hereinafter more fully set forth in the detail description and in the claims, reference being had to the accompanying drawings in which:

Figure 1:
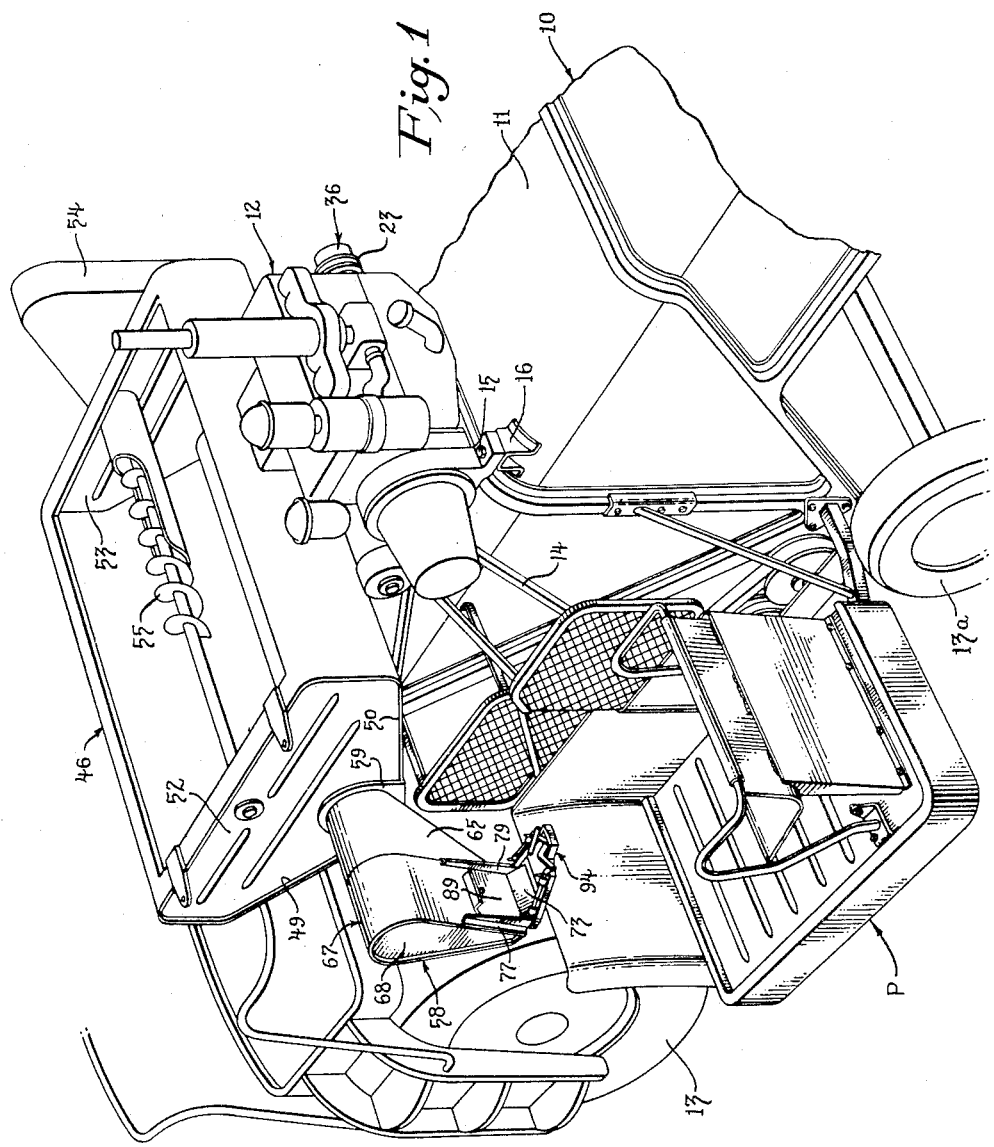
Figure 1 is a fragmentary perspective view of a combine embodying the invention, taken generally from the left, rear, upper side of the machine.
Figure 2:
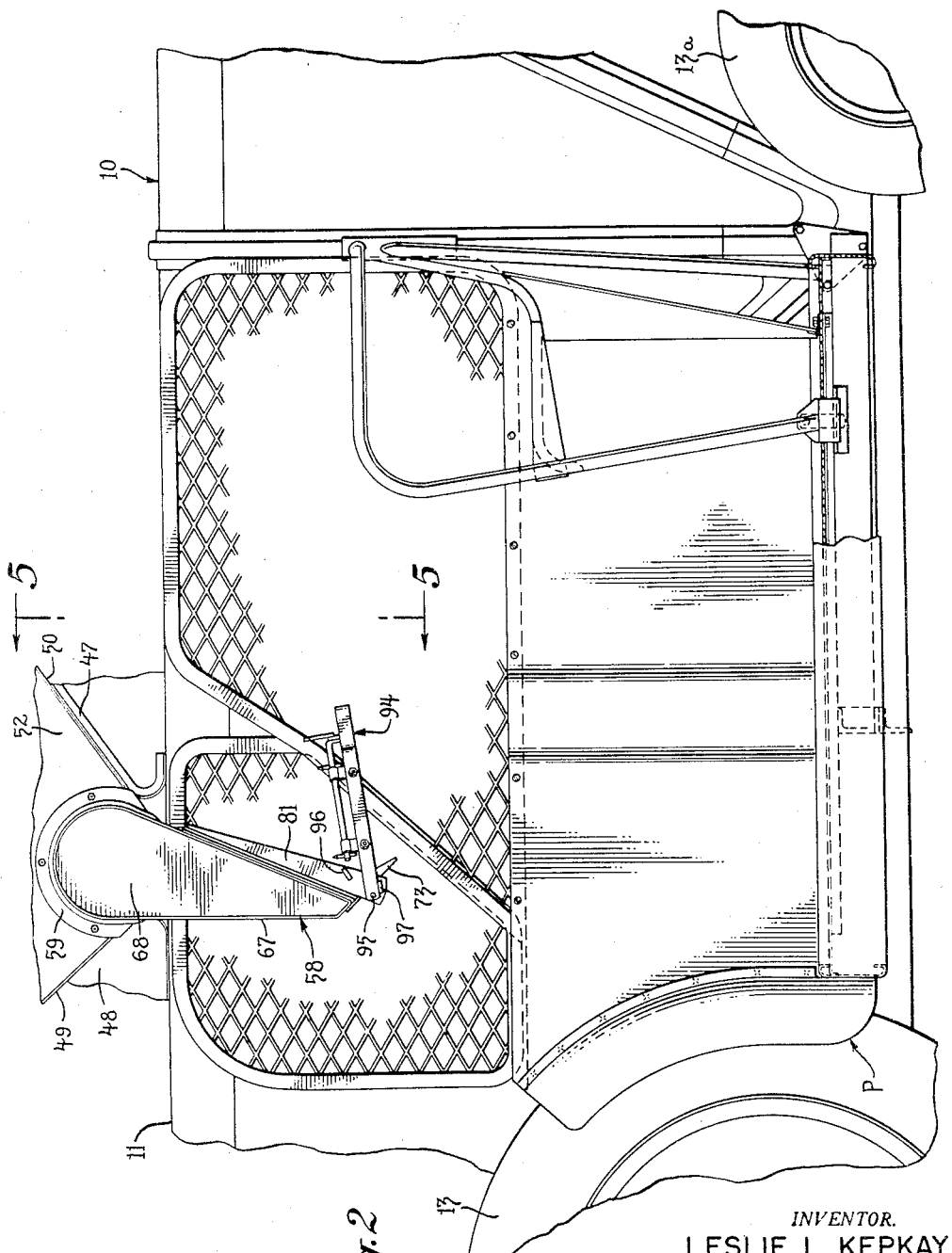
Figure 2 is a fragmentary left side elevational view of the machine shown in Figure 1, on enlarged scale, with certain parts broken away and in section for clarity of the drawings.
Figure 7:
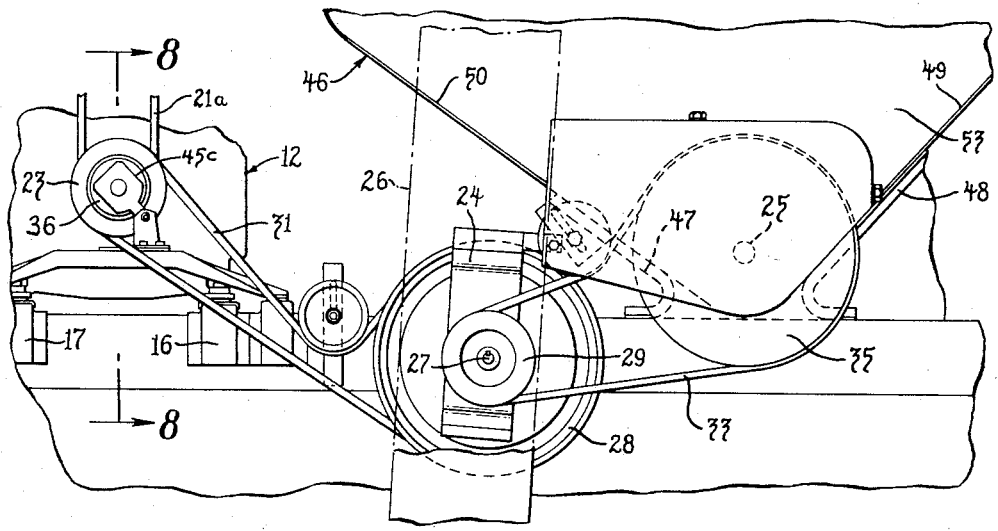
Figure 7 is a right side elevational view of the driving connection between the electric clutch and the unloading auger, certain parts being broken away for clarity.

Referring more particularly to Figure 1 of the drawings, the main body 10 of the combine has mounted on its top side 11 a power means 12 in the form of an internal combustion engine which furnishes the power for driving the combine over the ground on its front traction wheels 13 and rear steering wheels 13a. The engine also furnishes power for driving the various component parts of the combine, for instance, the flexible belt 14 at the left side of the combine furnishes power to the traction transmission, threshing cylinder and other operating parts, none of which are shown. The power plant 12 is secured by bolt means 15 to the mounting pads 16, 17 (Figures 1, 7 and 8) which in turn are welded to the body proper. The drive belt 14 is trained around a pulley (not shown) in the conventional manner on the left end of the crankshaft 20 (Figure 8).

Figure 8:
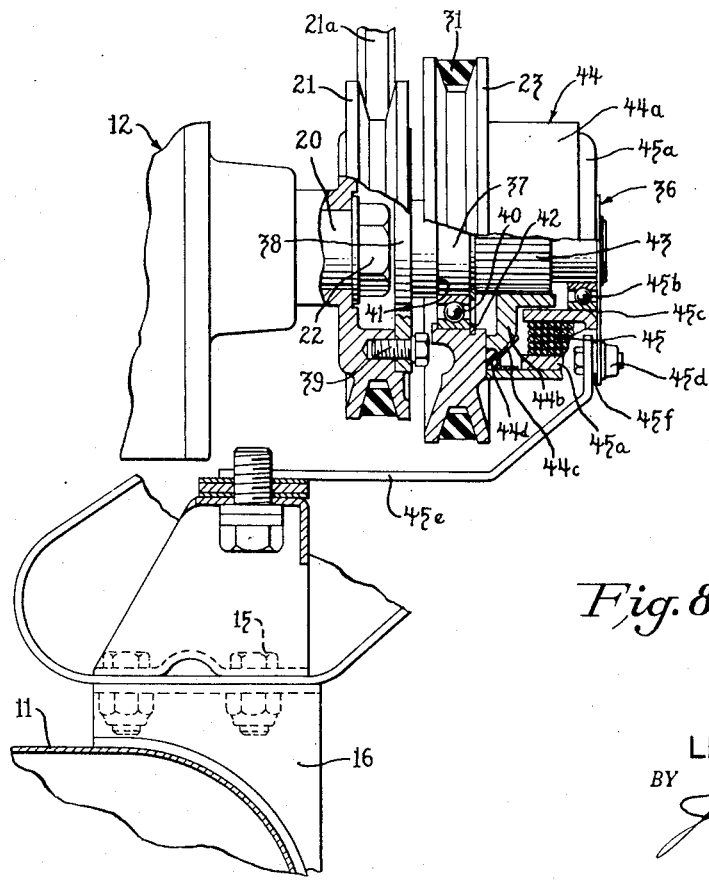
Figure 8 is a section taken on line 8—8 of Figure 7, but on an enlarged scale, showing the electric clutch, certain parts being broken away and in section.

As shown in Figure 8, pulley 21 is secured to the right end of crankshaft 20 by bolt 22 which is threadably engaged in the crankshaft. Pulley 21 furnishes the drive through flexible belt 21a to the radiator fan (not shown). Pulley 23 is drivingly connected to the unloading auger 25 as follows. A countershaft 27 (Fig. 7) is rotatably supported between the spaced bracket plates 24, 26, secured to the body of the combine. A large pulley 28 and a smaller pulley 29 are secured to countershaft 27 for providing a speed reduction between the engine 12 and auger 25. A flexible V belt 31 operatively connects the pulley 23 and the large countershaft pulley 28 while a V belt 33 is trained around the smaller pulley 29 and pulley 35 which is secured to the auger shaft 25.

An electric clutch 36 is interposed between the engine 12 and the auger 25 in order that the latter may be driven intermittently, although the engine operates continuously. Pulley 23 is connectable to the engine crankshaft 20 as follows. A stub shaft 37 having an integral flange 38 is secured by bolts 39 which extend through flange 38 and are threadably engaged in the pulley 21. The pulley 23 is rotatably mounted on shaft 37 by means of the ball bearing assembly 40 which is held axially by shoulder 41 and snap ring 42. Shaft 37 also has a splined portion 43 to which is splined the clutch member 44 for slight sliding thereon. Clutch member 44 includes the cylindrical shell 44a, hub portion 44b and the interconnecting pressed steel ring 44c which are all rigidly secured together to form an integral clutch member that is slidably mounted on shaft 37 for rotation therewith. Thus clutch member 44 rotates whenever the engine 12 is running. An electrical insulating material 44d is positioned between the shell 44a and hub 44b which can bear against the pulley 23 in the holding position as will appear. An electrical winding 45 is embedded in the circular channel shaped member 45a and this coil of the clutch is connected in the electrical circuit shown in Figure 6. A ball bearing assembly 45b supports the coil winding on the end of shaft 37 and a steady arm 45c is welded to the outside of the circular channel 45a. The steady arm in turn is secured by the brass bolt means 45d to the bracket 45e and acts to prevent the coil from rotating. A non-magnetic washer 45f is placed between the arm 45c and bracket 45e.

Figure 6:
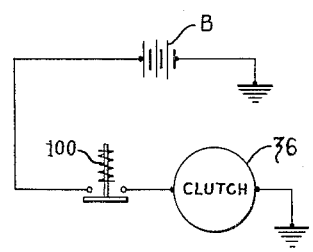
Figure 6 is wiring diagram of the electrical circuit connecting the unloading door with the electric clutch for actuating the unloading auger.

When the circuit of Figure 6 is closed, by means that will hereinafter appear, an electrical field is set up by the winding which causes the clutch member 44 to become magnitized and firmly hold pulley 23. In other words, when the electric circuit is closed, i.e., the electric clutch is operative, the pulley becomes rigidly secured to the shaft 37 and rotates therewith to drive the auger 25. For a detailed description of this general type of magnetic friction device and the manner in which the axial gripping takes place between the annular magnet 45a and the pulley 23, which forms the armature ring, reference may be had to the U. S. Patent No. 2,695,687, issued November 30, 1954, to Anderson.

Thus an intermittent drive means is provided between the power means and the unloading auger which causes the latter to be operative only when actual unloading is taking place, as will presently appear.

The grain tank 46 is of conventional design and is secured by brackets 47, 48 to the top side of the combine body and is located immediately forward of the power plant. The tank includes downwardly converging front and rear sides 49, 50, respectively, and side walls 52, 53. A conventional grain elevator 54 conveys the grain from the cleaning mechanism (not shown) to grain tank 46 and spreads it across the width of the tank by means of the conventional distributing auger 55 which is rotatably mounted in the side walls of the tank.

Figure 5:
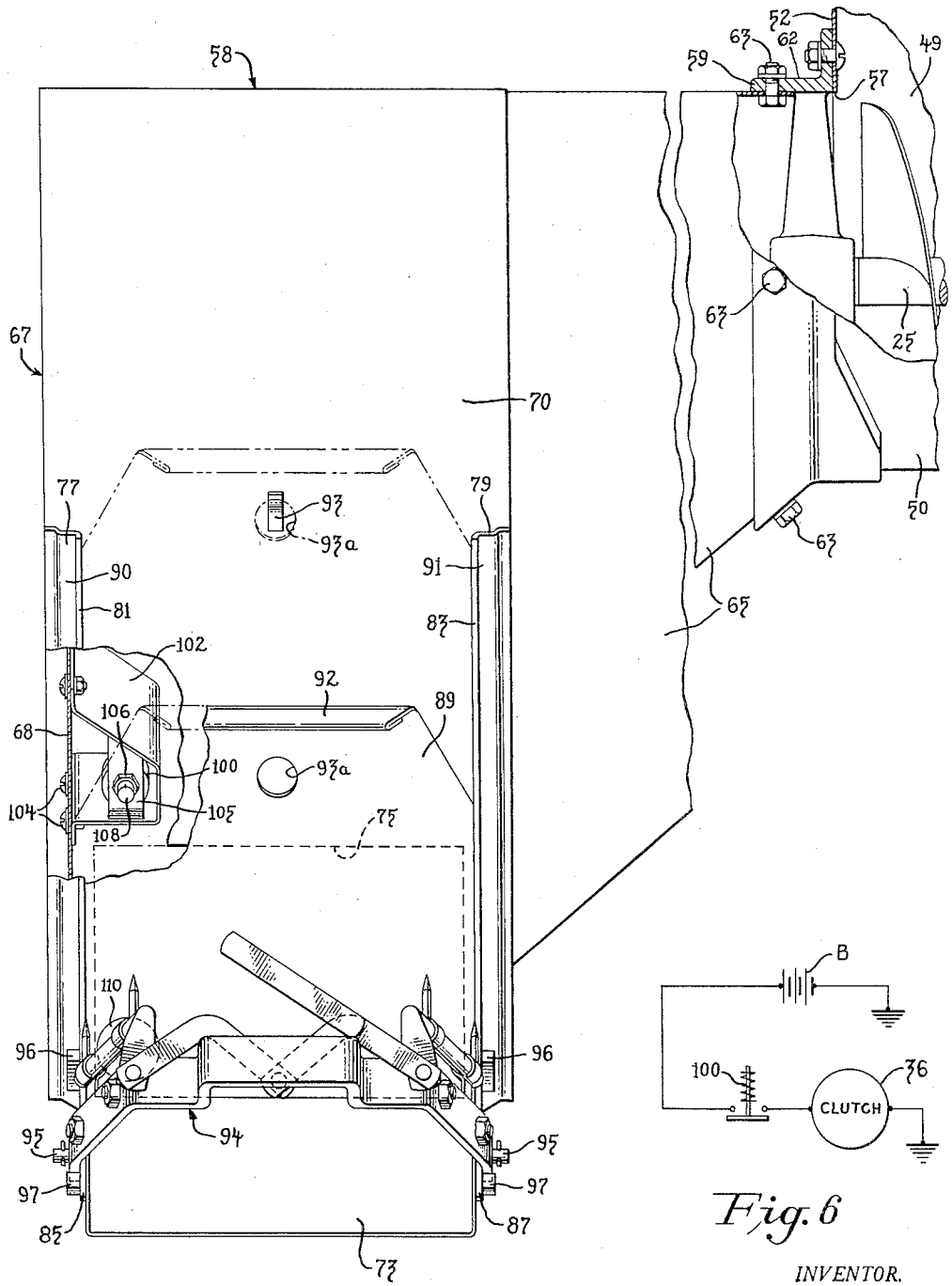
Figure 5 is a rear elevational view of the bagger spout and its attachment to the grain tank and unloading auger, taken generally on line 5—5 of Figure 2, but on an enlarged scale, and with certain parts broken away and in section for clarity.

The unloading auger shaft 25 is rotatably mounted in the side walls 52, 53 near the bottom thereof (Figures 5 and 7) and when driven by the engine serves to force the grain through the circular discharge opening 57 in the bottom of side wall 52. In conventional machines the auger 25 is in delivery communication with an unloading auger pipe attached to the side of the tank in the well known manner. In accordance with this invention, however, a bagger spout 58 is provided at this location of the grain tank as follows. A collar 59 is secured by bolt means to the tank side 52 and circumscribes the outlet 57. The collar 59 includes a central bearing 60 in which is rotatably mounted the auger 25. The collar also includes a generally horizontal flange 62 to which is attached by bolt means 63 an outwardly and downwardly extending spout portion 65. An outer spout portion 67 has an end wall 68 and also has front and rear sides 69, 70 which converge downwardly and terminate at their lower ends at 71 where a feed chute 73 is secured and extends rearwardly and downwardly therefrom. Thus the crop material is forced from the tank 46 by the auger and into the spout 58 where it simply falls by gravity to the lower portion thereof. In the lower portion of rear side 70 is a discharge outlet 75 (Fig. 5). Secured to lower end of rear side 70 and adjacent each side of the opening 75 is a guide member 77, 79. These guides have rearwardly extending flanges 81, 83, respectively, terminating at their lower ends 85, 87 beneath the opening 75. A sliding door 89 is shiftably mounted between rear side 70 and the offset portions 90, 91 of guides 77, 79 respectively and acts to close the opening 75 when in its lowermost position shown by the full lines of Figures 3 and 5. The door can be manually raised by its handle 92 to the open position shown by the broken lines in Figures 3 and 5 to permit grain to flow out of the spout and down chute 73. The door is held in the open position by the hook 93 secured to side 70 which is adapted to extend through aperture 93a in the door.

In operation, the mouth of the bag to be filled (not shown) would be slipped over the chute 73 and is held by the conventional bag holder 94 which is pivoted by pins 95 extending through lower ends of the guides 77, 79. Stops 96, 97 are provided on the guides for limiting the manual swinging movement of the bag holder 94 which is necessary for packing the grain in the bag while the latter is being filled.

The bagger platform P, shown best in Figure 1, supports the operator for the bagger unit and the bag being filled rests on this platform directly beneath the spout 58. When filled, the bag may be easily deposited on the ground for subsequent pickup. If the details of construction and operation of this platform are desirable reference may be had to the copending U. S. patent application, Serial No. 589,158 filed June 4, 1956, entitled "Combine Bagger Platform Attachment," now Patent No. 2,848,858, issued Aug. 26, 1958.

Figures 3, 4:
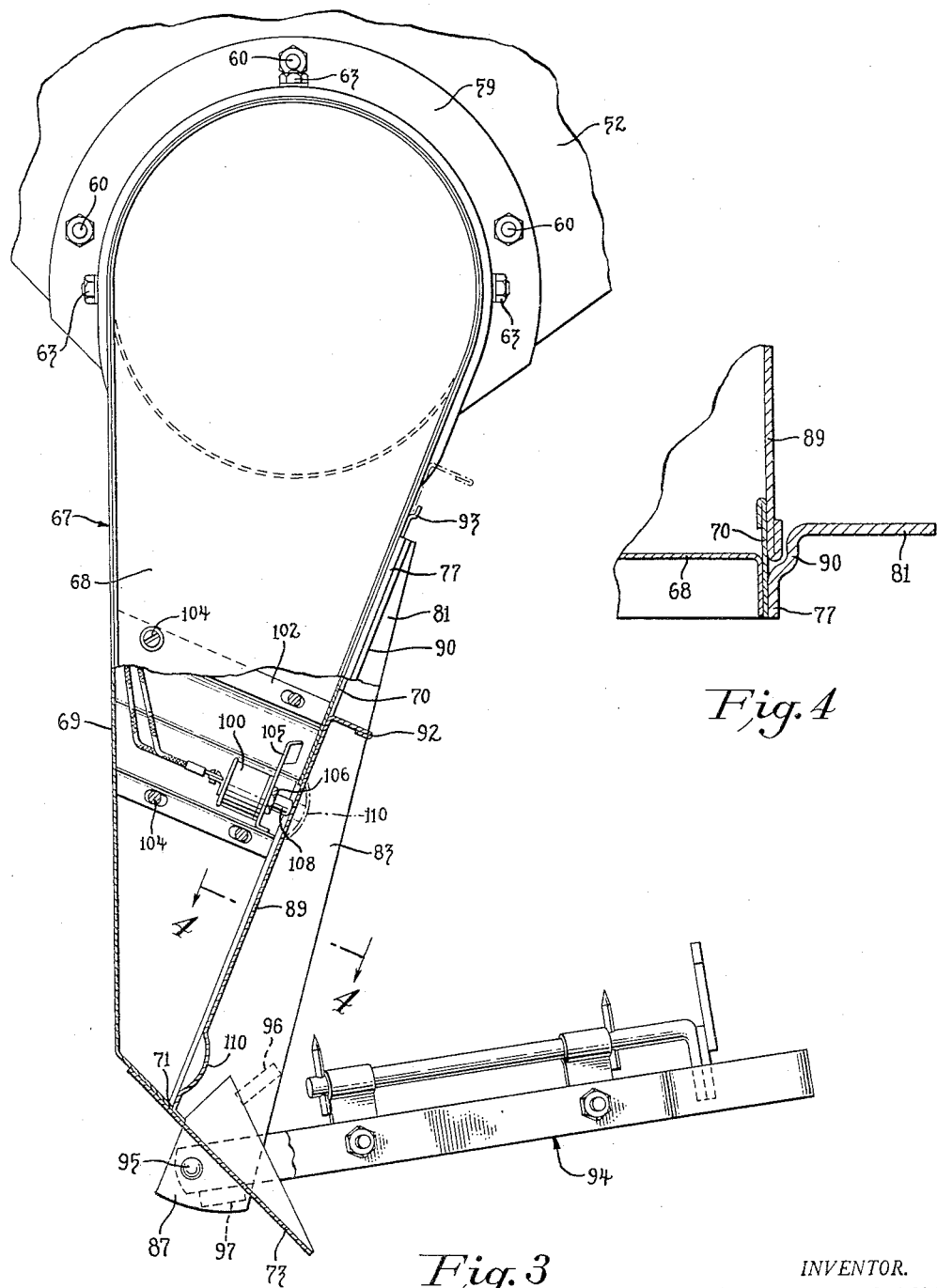
Figure 3 is another view of the bagger spout as shown in Figure 2 but on an enlarged scale and with certain parts broken away and in section for clarity.
Figure 4 is a sectional view of the sliding discharge door construction, taken on line 4—4 of Figure 3 but on an enlarged scale.

Control means, operative by movement of the door 89, are provided for actuating the intermittent drive means for the unloading auger 25 whereby the latter is operative to discharge grain from the tank only when the door is open. By making the auger operative only when grain is to be discharged from the door, unnecessary churning of the grain and consequent bruising of the kernels is eliminated. This control means includes a conventional electric push button switch 100 mounted within the spout by the bracket 102 and, as shown in Figure 6, placed in the electrical circuit with the battery B to operate the electric clutch, previously described, by closing the circuit, as will more fully appear hereinafter. Bracket 102 is adjustably secured to the end wall 68 of the spout by bolt means 104 and this bracket acts to shield the switch from the grain in the spout as well as rigidly support it. A mounting plate 105 forms part of this support bracket and has an aperture in which the switch is held captive by nut 106. A slidable plunger 108 extends from the switch and bears against the inner surface of the door 89. The operation of the switch is such that when the plunger is extended outwardly from the body of the switch, it is in the "on" position, i.e., the circuit is closed and operative. When the plunger is depressed to the "off" position, the circuit is open, or inoperative. The total travel of the plunger of this type of switch is on the order of 3/16 of an inch between "on" and "off" positions. As shown in Figures 3 and 5, a depression 110 is pressed into the lower portion of door 89 and the plunger is spring biased to extend into this depression, when the door is raised to its open position. If the door is not in the fully open position, the plunger will be prevented from extending to the "on" position because of its contact against the door 89.

It will now be seen that when the door is not fully open the electrical circuit of Figure 6 will be open and the electric clutch, and consequently the unloading auger, will be inoperative. Only when the circuit is closed by raising the door to the fully open position will the electric clutch be engaged to drive the unloading auger.

By means of this invention, a bagging operator can bag the crop as the machine advances over the field. It is possible for the operator to pause occasionally when the level of the grain in the tank has been reduced sufficiently. He can work at an efficient pace in attaching the bags, insuring that they are filled properly, and depositing the bags at spaced intervals in the field.

Convenient means have been provided for the single operator to allow the unloading auger to operate only when necessary, that is, only when a bag is actually being filled. The bagger attachment of this invention can be readily utilized on a conventional combine and without the necessity of penalizing the owner costwise for a special, small production machine.

It should be understood that it is not intended to limit the invention to the above described forms and details, and that the invention includes such other forms and modifications as are embraced by the scope of the appended claims.

I claim:

1. In a combine having a grain tank with a power driven unloading auger mounted therein for unloading grain through a discharge opening at one side of said tank, power means carried by said combine for driving said auger, the improvement residing in, flexible belt drive means including an electric clutch operatively connecting said power means with said auger for operation of the latter, a bagger spout secured to said tank and adapted to receive grain discharged through said opening by said auger, said spout extending outwardly from said tank and having a discharge outlet adjacent its lower side, a door shiftably mounted on said spout for shifting between an outlet closing position and an open position, an electric switch mounted on said spout and operative by said door for actuating said clutch whereby said auger is rendered operative to unload said tank when said door is in the open position and is rendered inoperative when said door is in the outlet closing position.

2. In a combine having a grain tank secured on the top side thereof, said tank having a power driven unloading auger mounted therein for unloading grain through a discharge opening at one side of said tank, a power plant mounted on the top on said combine for driving said auger, the improvement residing in, an electric clutch secured to said plant, flexible belt means operatively connecting said clutch with said auger for operation of the latter, a bagger spout secured to said tank and adapted to receive grain discharged through said opening by said auger, said spout extending outwardly from said tank and having a discharge outlet adjacent its lower side, a door shiftably mounted on said spout for shifting between an outlet closing position and an open position, an electric switch carried by said spout and operative by said door for actuating said clutch whereby said auger is rendered operative to unload said tank when said door is in the open position and is rendered inoperative when said door is in the outlet closing position.

3. A bagger attachment for a combine having a grain tank, an unloading auger rotatably mounted in said tank, and a power plant for driving said auger, said attachment including an electric clutch secured to said plant, flexible belt drive means connecting said clutch to said auger, a bagger spout secured to said tank and extending therefrom and adapted to receive grain discharged from said tank by said auger, a discharge door mounted on said spout adjacent a lower portion thereof for shifting between closed and open positions, control means including an electrical switch mounted on said spout and operative by said door for actuating said clutch whereby said auger is driven to unload said tank when said door is in the open position and rendered inoperative when said door is closed.

4. In an agricultural harvesting machine, the combination comprising, a frame, a grain tank mounted transversely on said frame, an unloading auger journaled in the lower portion of said tank, the bottom of said tank sloping down toward said auger, a power source for powering the harvesting functions of the machine, a belt drive coupling said power source to said auger, a clutch in said belt drive for selectively operating said auger from said power source, a discharge opening in said tank at the discharge end of said auger, a bagger spout in communication with said opening and extending downwardly to define an outlet, a door slidably mounted on said spout and being manually shiftable between outlet closing and outlet opening positions, and means interconnecting said door and said clutch for engaging said clutch only when the door is in said outlet opening position so that the auger is driven only when grain may be discharged from the tank.

References Cited in the file of this patent
UNITED STATES PATENTS

| | | |
|---|---|---|
| 630,075 | Root | Aug. 1, 1899 |
| 1,039,352 | Bernotowicz | Sept. 24, 1912 |
| 1,630,538 | Micallef | May 31, 1927 |
| 1,972,808 | Waterstone | Sept. 4, 1934 |
| 2,421,418 | Grossman | June 3, 1947 |
| 2,544,210 | Zenke et al. | Mar. 6, 1951 |
| 2,597,186 | Roscoe et al. | May 20, 1952 |
| 2,598,227 | Constantine | May 27, 1952 |
| 2,759,485 | Guth | Aug. 21, 1956 |